| United States Patent [19] | [11] Patent Number: 4,812,267 |
| Hoffmann et al. | [45] Date of Patent: Mar. 14, 1989 |

[54] PROCESS FOR EXTRUDING A THERMOPLASTIC MELT

[75] Inventors: Karl-Ludwig Hoffmann; Gunter Eiden, both of Frankfurt am Main; Eugen Morach, Liederbach, all of Fed. Rep. of Germany

[73] Assignee: Hoechst Aktiengesellschaft, Frankfurt am Main, Fed. Rep. of Germany

[21] Appl. No.: 103,887

[22] Filed: Oct. 2, 1987

[30] Foreign Application Priority Data

Oct. 6, 1986 [DE]  Fed. Rep. of Germany ....... 3633966

[51] Int. Cl.$^4$ ............................................. B29C 47/12
[52] U.S. Cl. ..................... 264/169; 264/564; 264/130; 264/131; 264/337; 425/461; 425/467
[58] Field of Search ............ 264/169, 209.7, 337, 264/127, 130, 131, 213, 564; 425/461, 465–467, 380, 532

[56] References Cited

U.S. PATENT DOCUMENTS

| 3,847,530 | 11/1974 | Hamilton | 425/461 |
| 3,893,796 | 7/1975 | Korostoff et al. | 425/461 |
| 3,942,937 | 3/1976 | Prober et al. | 264/169 |
| 4,615,858 | 10/1986 | Su | 425/465 |
| 4,701,116 | 10/1987 | Achelpohl et al. | 425/461 |

FOREIGN PATENT DOCUMENTS

| 53-37292 | 10/1978 | Japan | 425/461 |
| 59-118419 | 7/1984 | Japan | 425/461 |
| 61-249735 | 11/1986 | Japan | 425/461 |
| 61-279525 | 12/1986 | Japan | 425/461 |

*Primary Examiner*—Jeffery Thurlow
*Attorney, Agent, or Firm*—Connolly & Hutz

[57] ABSTRACT

On extrusion of thermoplastic melts, flow anomalies occurring in the extrusion dies can be decisively reduced when dies are used whose surfaces coming into contact with the melts are provided with a thermally applied spray coating.

4 Claims, No Drawings

PROCESS FOR EXTRUDING A THERMOPLASTIC MELT

DESCRIPTION

The invention relates to a process for extruding a thermoplastic melt, in which process the melt exhibits improved flow behavior.

During extrusion of thermoplastic melts through shaping dies, for example nozzles, flow anomalies, such as, for example, waviness of the surface of the extrudate, peeling, melt fracture and similar effects can occur as a consequence of the rheological properties of the melts. This undesired behavior reduces the quality of the extrudates. The flow anomalies are caused, apart from by the flow channel geometry and the processing conditions (and thus by the rheological properties of the melts), also by the surface properties, i.e. the wettability, the frictional resistance, the surface structure etc. of the die.

Attempts to positively influence the adhesion and slip of the melts at the die surface through electroplating, vapor-deposition of metals in vacuo or coating the die surface with polytetrafluoroethylene have remained unsuccessful or unsatisfactory since it has not been possible to achieve satisfactory corrosion- and/or wear-resistance. In addition, such coatings have remained limited to special cases. Thus, dies made from steel having a ground or polished surface are employed virtually exclusively.

It has now been found that the flow anomalies can be decisively reduced when the extrusion of the thermoplastic melt is carried out in a die whose surface is provided with a spray coating.

The invention thus relates to a process for extrusion of a thermoplastic melt, in which process a thermoplastic is molten in an extruder at elevated temperature under shear and transported as a homogeneous melt through an extrusion die whose surface coming into contact with the melt is coated, wherein the melt is transported through a die whose surface coming into contact with the melt has been coated by means of a thermal spray process with a powder, having a grain size of 1 to 250 μm, of a metal, a metal alloy, a metal carbide, a metal oxide or a cermet.

The invention furthermore relates to the die to be used for this process.

In the process according to the invention, a thermoplastic is molten in an extruder at elevated temperature under shear and transported as a homogeneous melt through the extrusion die.

The process can be used for all thermoplastics; for example, the following groups may be listed:

Polymers which are derived from mono- or diunsaturated hydrocarbons, for example polyolefins such as polyethylene, polypropylene, 1-polybutene, polyisobutene, 1-polymethylbutene, 1-polymethylpentene, polyisoprene, polybutadiene and polystyrene, copolymers of the monomers on which the homopolymers mentioned are based, such as ethylene-propylene copolymers, propylene-1-butene copolymers, propylene-isobutene copolymers and styrene-butadiene copolymers, and terpolymers of ethylene and propylene with a diene, such as, for example, hexadiene, dicyclopentadiene or ethylidenenorbornene; mixtures of the abovementioned homopolymers, such as, for example, mixtures of polypropylene and polyethylene, polypropylene and 1-polybutene, polypropylene and polyisobutene or of butadiene-acrylonitrile copolymers with a styrene-butadiene copolymer.

Halogen-containing vinyl polymers, such as polyvinyl chloride, polyvinylidene chloride, polyvinyl fluoride, polychloroprene, chlorinated rubbers and copolymers of vinyl chloride and vinylidene chloride with one another and with other olefinically unsaturated monomers.

Polymers which are derived from α,β-unsaturated acids and their derivatives, such as polyacrylates, and polymethacrylates, polyacrylamides and polyacrylonitrile, and their copolymers with one another and with other vinyl compounds, such as acrylonitrile-butadiene-styrene, acrylonitrilestyrene and acrylonitrile-styrene-acrylate copolymers.

Polymers which are derived from unsaturated alcohols and amines or their acrylic derivatives or acetals, such as polyvinyl alcohol, polyvinyl acetate, stearate, benzoate and maleate, polyvinyl butyral, polyallyl phthalate and polyallyl melamine, and their copolymers with other vinyl compounds, such as ethylene-vinyl compounds, such as ethylene-vinyl acetate copolymers. Homopolymers and copolymers which are derived from epoxides, such as polyethylene oxide, or the polymers which are derived from bisglycidyl ethers.

Polyacetals, such as polyoxymethylene and polyoxyethylene, and polyoxymethylenes which contain ethylene oxide as comonomer.

Polyurethanes and polyureas Polycarbonate

Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

Polyesters which are derived from dicarboxylic acids and dialcohols and/or from hydroxycarboxylic acids or the corresponding lactones, such as polyethylene terephthalate, polybutylene terephthalate and poly-1,4-dimethylolcyclohexane terephthalate.

The abovementioned thermoplastics are extruded at a temperature of about 100° C. to about 300° C., depending on the type of the thermoplastic.

The dies to be used for the process according to the invention are nozzles and extrusion dies and blown-film dies. Their design is generally known. They are employed for the production of pipes, profiles and blow-molding parisons. The surface coming into contact with the thermoplastic melt is coated by means of a thermal spray process with a powder of a metal, a metal alloy, a metal carbide, a metal oxide or a cermet.

Suitable thermal spray processes are primarily flame spraying and plasma spraying. In flame spraying, the spray additive (=coating material) in powder form is molten by a fuel gas/oxygen flame and projected onto the workpiece surface by the combustion gas alone or with simultaneous support by an atomizing gas (e.g. compressed air). In plasma spraying, the spray additive in powder form is molten in or outside the spray pistol by a plasma beam and projected onto the workpiece surface. The plasma is generated by an arc burning in the gas or in the gas mixture, accelerated and bundled, and leaves the spray nozzle as a plasma beam of high energy density.

Suitable metals in powder form are titanium, niobium, tantalum, chromium, molybdenum, tungsten, nickel, copper, aluminum and silicon.

Suitable alloys in powder form are nickel-chromium, nickel-aluminum, copper-aluminum, copper-tin, cobalt-chromium-tungsten and aluminum-silicon.

Metal carbides which should be mentioned are tungsten carbide and chromium carbide.

Suitable metal oxides are aluminum oxide, aluminum oxide/titanium dioxide, aluminum oxide/chromium oxide, aluminum oxide/magnesium oxide, chromium oxide, chromium oxide/titanium dioxide, titanium dioxide, barium oxide/titanium dioxide, zirconium oxide/calcium oxide, zirconium oxide/magnesium oxide, zirconium oxide/silicon dioxide and zirconium oxide/yttrium oxide.

In addition, powders of cermets, i.e. two-phase systems of oxides, carbides, borides, silicides, nitrides and metals, for example aluminium oxide and aluminum, beryllium, cobalt, chromium, iron or chromium-nickel-iron, chromium oxide and chromium, magnesium oxide and aluminum, beryllium, cobalt, iron or magnesium, silicon oxide and chromium or silicon, zirconium oxide and zirconium, silicon carbide and aluminum, silicon, cobalt or chromium, titanium carbide and molbdenum, tungsten, iron, chromium, nickel and cobalt, chromium carbide and nickel, tantalum carbide and nickel, iron or cobalt, chromium boride and nickel or nickel-aluminum, titanium boride and iron, nickel or cobalt, zirconium boride and iron, nickel, cobalt or nickel-aluminum, molybdenum silicide and nickel, cobalt, platinum, iron or chromium, and titanium nitride and nickel, are suitable.

The spray additive in powder form can be employed as a pure powder or as a mixture of powders. It is also possible to use agglomerated or coated powders. Aluminum oxide/titanium oxide is preferably used.

The grain size of the spray additive in powder form is advantageously 1 to 250 $\mu$m, preferably 1 to 90 $\mu$m, in particular 5 to 45 $\mu$m. The decisive factor for the choice of grain size is, inter alia, the spray coating roughness required, which is about 70 $\mu$m without subsequent processing. If required, the roughness can be reduced toless than 1 $\mu$m by subsequent processing, for example grinding.

Through the process according to the invention using the die according to the invention, the flow properties of thermoplastic melts can be influenced so that flow anomalies at the surface of the extrudate are decisively reduced or completely suppressed. At the same time, output is increased. Furthermore, it has the advantage that the die to be used need not to be of a special-purpose alloy, but instead can to be of an inexpensive basic material, which can be provided suitable spray coatings in accordance with the specific requirements of the thermoplastic melt to be extruded. In addition, damaged or worn dies can be regenerated cheaply and quickly.

EXAMPLE 60-liter canisters are produced on a blow-molding machine (extruder screw 90 mm, 20 D; temperatures in the extruder cylinder 160° to 200° C. or 210° to 230° C.). For this purpose, various nozzles were used in the extruder head:

A: trumpet shape, steel, uncoated
B: trumpet shape, steel, surfaces coming into contact with the melt roughened by blasting with corundum and coated with aluminum oxide/titanium dioxide (grain size 6 to 22 $\mu$m) by means of plasma spraying.

Two different ethylene polymers were extruded:

I: homopolymer, high-molecular-weight, MFI 190/2=2 g/10 min, density 0.950 g/cm$^3$
II: copolymer, high-molecular-weight, MFI 190/2=5 g/10 min, density 0.946 g/cm$^3$.

The tube emerging from the nozzle was assessed visually.

| Score | Waviness |
|---|---|
| 1 | no wave formation |
| 2 | slightly wavy |
| 3 | moderately wavy |
| 4 | wavy |
| 5 | very wavy |
| 6 | extremely wavy |

In addition, the output was measured. The results of the experiments are collated in the following tables.

TABLE 1

Dependency of output rate on extrudate delivery pressure and on nozzle surface
Nozzles A and B, material II

| Extrudate delivery pressure [bar] | Output rate [kg/sec.] | |
|---|---|---|
| | Nozzle A | Nozzle B |
| 50 | 0.1 | — |
| 60 | 0.2 | 0.2 |
| 70 | 0.3 | 0.3 |
| 80 | 0.4 | 0.4 |
| 90 | 0.6 | 0.5 |
| 100 | 0.8 | 0.9 |
| 110 | 1.1 | 1.3 |
| 120 | 1.4 | 2.0 |
| 130 | 1.7 | 2.7 |

TABLE 2

Waviness of the extrudate surfaces as a function of extrudate delivery pressure
Nozzles A and B, material II

| Extrudate delivery pressure | Nozzle A Waviness, | | Nozzle B | |
|---|---|---|---|---|
| | internal | external | internal | external |
| 50 | 2 | 2 | — | — |
| 60 | 2 | 1 | 2 | 1-2 |
| 70 | 4 | 3 | 2 | 1-2 |
| 80 | 3 | 4 | 1 | 1 |
| 90 | 2 | 2 | 1 | 1 |
| 100 | 1 | 2 | 1 | 1 |
| 110 | 1 | 2 | 1 | 1-2 |
| 120 | 1 | 2 | 1 | 1-2 |
| 130 | 1 | 2 | 1 | 2 |

TABLE III

Waviness of the extrudate surface as a function of extrudate delivery pressure
Nozzle B, material I

| Extrudate delivery pressure | Waviness | |
|---|---|---|
| | internal | external |
| 50 | 1-2 | 1-2 |
| 60 | 2-3 | 1-2 |
| 70 | 2-3 | 1-2 |
| 80 | 2 | 2 |
| 90 | 2 | 2 |
| 100 | 2 | 2 |
| 110 | 2 | 1-2 |
| 120 | 2 | 1-2 |
| 130 | 2 | 1-2 |

We claim:

1. A process for extruding a thermoplastic melt, in which process a thermoplastic is molten in an extruder at elevated temperature under shear and transported as a homogeneous melt through an extrusion die whose surface coming into contact with the melt is coated, wherein the melt is transported through a die whose surface coming into contact with the melt has been coated by means of a thermal spray process with a powder, having a grain size of 1 to 250 μm, of a metal, a metal alloy, a metal carbide, a metal oxide or a cermet to provide a spray coating roughness of up to about 70 μm.

2. The process as claimed in claim 1, wherein the melt is transported through die whose surface coming into contact with the melt has been coated with an aluminum oxide/titanium dioxide powder mixture.

3. An extrusion forming metal die, wherein a surface coming into contact with the thermoplastic melt has been provided with a coating having a roughness up to about 70 μm by means of a thermal spray process with a powder, having a grain size of 1 to 250 μm, of a metal, a metal alloy, a metal carbide, a metal oxide or a cermet.

4. An extrusion forming apparatus having a metal surface thereof provided with a coating having a roughness up to about 70 μm comprising the product of applying to the metal surface by thermal spraying a powder mixture of aluminum oxide/titanium oxide, said coated surface being adapted for contact with a thermoplastic melt.

* * * * *